United States Patent [19]

Allen

[11] 4,006,487
[45] Feb. 1, 1977

[54] PHOTOMICROGRAPHIC ILLUMINATOR

[76] Inventor: Raymond P. Allen, 2242 Sourek Road, Akron, Ohio 44313

[22] Filed: Sept. 30, 1975

[21] Appl. No.: 618,019

Related U.S. Application Data

[62] Division of Ser. No. 524,036, Nov. 15, 1974, abandoned.

[52] U.S. Cl. .............................. 354/79; 350/96 R
[51] Int. Cl.² ......................................... G03B 17/48
[58] Field of Search ............ 354/126, 79, 75, 145; 350/96 R, 96 B, 87, 91; 240/2 MA, 2 M, 1 EL, 1 LD; 355/68, 70

[56] References Cited

UNITED STATES PATENTS

| | | | |
|---|---|---|---|
| 2,691,918 | 10/1954 | Robins et al. | 240/2 MA |
| 2,739,228 | 3/1956 | Robins | 240/13 X |
| 3,315,680 | 4/1967 | Silbertrust et al. | 350/96 B |
| 3,790,249 | 2/1974 | Treace | 350/91 |
| 3,833,282 | 9/1974 | Kappl et al. | 350/87 |
| 3,889,279 | 6/1975 | Klemann et al. | 354/79 |

FOREIGN PATENTS OR APPLICATIONS 1,913,711  10/1969  Germany .............................. 350/87

*Primary Examiner*—Edna M. O'Connor
*Attorney, Agent, or Firm*—Harold S. Meyer

[57] ABSTRACT

An illumination system for photomicrography includes direction of the light for illumination of the object through a fiber optic, the exit end of which replaces the usual illuminating lamp at the entrance pupil of a conventional illumination system. The light of an incandescent lamp directed through the fiber optic is used for selecting the view and focusing the camera. Light from a high intensity electronic flash, coupled to the camera shutter, is directed through the fiber optic, in replacement of the incandescent lamp, for the photography. An integrating light meter supplied by a beam splitter in the microscope tube terminates the flash when a proper exposure is achieved.

10 Claims, 7 Drawing Figures

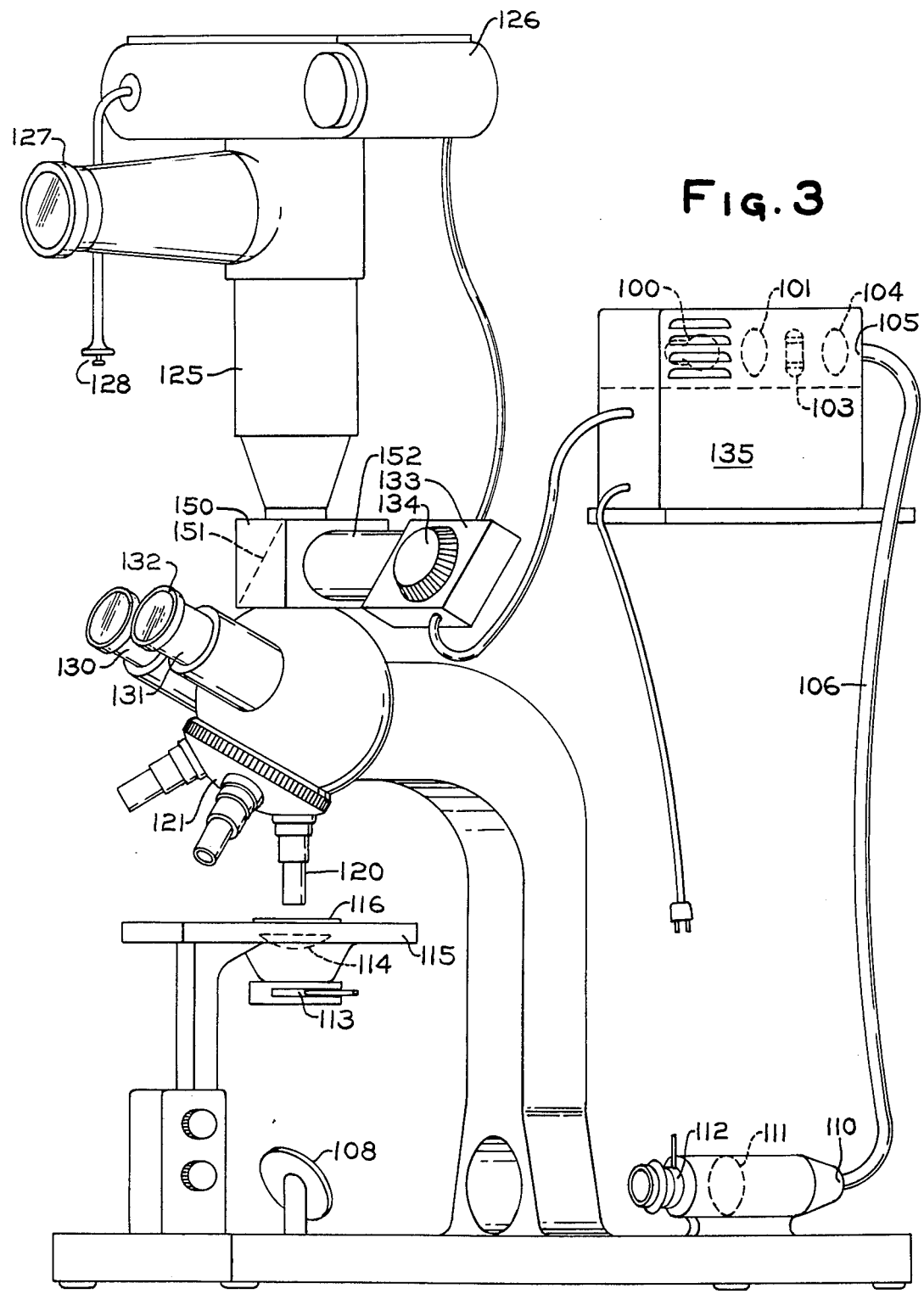

PHOTOMICROGRAPHIC ILLUMINATOR

This is a division of application Ser. No. 524,036, filed Nov. 15, 1974, now abandoned.

BACKGROUND

Photography of very small objects has always been difficult and complicated. It involves all the usual problems of photography plus the problems of using a microscope to select an area to be photographed. The microscope is a complicated optical instrument requiring provision of special means for illumination to provide an image for visual observation and finally of means for then transferring the image of adequate brightness to a suitable camera. A special problem is that lighting conditions for visual observation are not suitable for photography except for a fairly long exposure, which is not possible for a moving object or when vibration is encountered. It is, therefore, often necessary and generally desirable to use a flash lamp for the actual photography, but this is greatly complicated by the need for providing dual illumination systems, both of which have to comply with quite specific optical requirements and which have to replace one another without essential change of the selected optical conditions, such as direction and uniformity of illumination, accurate focusing, and the like.

Efforts to simplify and automate the procedure and equipment have not been particularly successful, although excellent results have been obtained by use of the inconvenient, bulky, and cumbersome equipment heretofore known. Such efforts have included use of high intensity illumination such as xenon arcs, either with conventional mirrors and condensers, or combined with a fiber optic "light pipe" to space the light source from the microscope and prevent the heat of the lamp from damaging the microscope or the specimen being photographed.

Other attempted solutions have included various arrangements of dual light sources. One light source would be a continuously illuminated focusing lamp, such as an incandescent tungsten filament lamp, for scanning of the object, selecting the desired field of view, and focusing. It would then be physically replaced by a flash lamp, and its associated electrical equipment. The consequence has been that the operator has had his microscope instrument surrounded by inconveniently located heat-generating equipment, requiring a carefully scheduled sequence of manual operations in order to produce each photograph.

The principal objects of this invention, accordingly, are to simplify the mechanical equipment required to be manipulated, minimize the cluttering of the operator's work space, and at the same time to automate the procedure so that photomicrographs can be obtained easily and quickly and with reasonable assurance of success with each photographic exposure.

SUMMARY OF THE INVENTION

In accordance with this invention, a microscope is equipped with a conventional substage condenser system, and preferably with a Kohler system illuminator, the input or entrance pupil of which is the exit of a fiber optic of any desired length, with the input of the fiber optic coupled to a pair of light sources, one of which, when selectively operated, will furnish continuous light, and the other of which, when operated, will furnish an intense brief flash of light. This combination can be used with any ordinary type of microscope but is preferably used with a microscope having a separate tube for a camera as well as a separate tube for visual observation, and preferably a further location for placement of an integrating light sensor for control of the duration of the flash.

The dual light sources can be arranged in various ways in relation to the entrance end of the fiber optic. One way is to place the continuous light source as close as posible to the flash tube. Another is to use a flash tube which is capable of generating low intensity continuous light as well as high intensity brief flashes of light. However, a preferred arrangement is to carry out preliminary operations, such as focusing, with a continuous source of light, such as an incandescent lamp, the light of which is brought to a focus in the transparent tube of the flash tube so that the flash tube will appear to be the source of both the continuous light for preliminary selection of the field to be photographed and also the intense flash of light for the actual photography. In any of these arrangements the continuous light can be used for photography without the flash if there is some special reason for doing so.

In arranging the dual light sources, the flash tube can be placed immediately against the input end of the fiber optic, or it can be spaced from the fiber optic, with its light and that of an incandescent lamp directed to the fiber optic by any of a number of arrangements of plane mirrors, focusing mirrors, or lenses.

In any arrangement of the light sources, both the continuous light and the flash are directed on the imput end of a flexible fiber optic of convenient length. If the two light sources are sufficiently close together, or if they can appear to be identical in location, the light is preferably collected by a spherical or parabolic mirror, or a collecting lens, or both, focused on the input end of a simple fiber optic element.

If it is more convenient to place the light sources in separate locations, the light from both of them can be directed to the input end of the fiber optic, either simultaneously or successively, by a semitransparent mirror or by placement and removal at the appropriate moment of a tiltable or slidable opaque mirror. Alternatively, the entrance end of the fiber optic can be shifted between positions aligned with first one and then the other light source.

Any of a variety of forms of fiber optics may be used. For a long narrow source such as a small flash tube, a fiber optic may have an oblong input face and a circular exit. For a large diffuse light source, a fiber optic tapering from a large diameter input to a smaller diameter exit may be useful.

Alternatively, the two light sources can be directed to the two branches of a bifurcated fiber optic element so that all of the light will emerge from a single exit spot at the opposite end.

An important element of this invention is that the exit end of the fiber optic serves as the entrance pupil of a conventional microscope illumination system, preferably a Köhler microscope illumination system, as though the fiber optic were a primary light source. Accordingly, the exit end of the fiber optic will preferably be optically aligned with all the elements of a Köhler system, including at least a light collecting lens and an adjacent diaphragm functioning as a field stop, and then a second diaphragm functioning as the aperture of the substage condenser lens which is immediately below the stage of the microscope. Of course, any of the lenses may be couplets or triplets if that is desired for convenience or for elimination of aberrations.

As is well known, almost all good microscopy is performed with Köhler illumination because it assures absolutely uniform illumination of the entire object field with light passing not only along the optical axis but also at considerable angles from all directions. An important feature of this invention is that it permits all the known benefits of Köhler illumination to be achieved but at much greater convenience and assurance of success than was previously possible.

An unexpected benefit of this invention turns out to be that the cool light emerging from the exit end of the fiber optic permits interchange of location of the light collecting lens and the field stop diaphragm, so that this diaphragm may be between the lens and the source of light. In some situations in which glare from stray light in the microscope is troublesome, this substantially reduces the glare.

If the microscope is equipped with a simple condenser lens for the so-called "critical" system of illumination in which the light source is imaged in the object plane, uniformity of illumination may require presence of a light diffuser. In the practice of this invention with such a microscope, a ground glass may be placed between the fiber optic and the object plane.

THE DRAWINGS

In the accompanying drawings,

FIG. 3 is an elevation illustrating a complete photographic microscope equipped with the illumination system of this invention.

DETAILED DESCRIPTION

Figure 1:
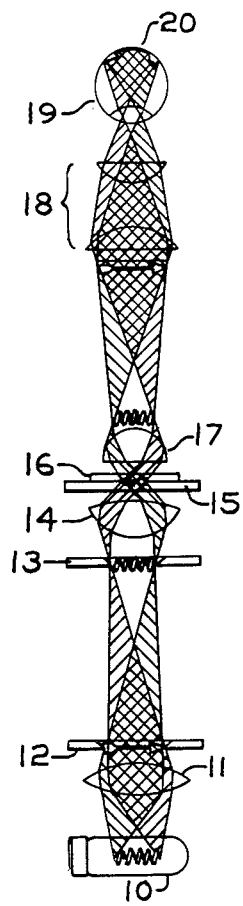
FIG. 1 is a diagram showing the essential features and necessary basic arrangement for Köhler illumination of an object.

Since a Köhler illumination system is a preferred part of the combination of this invention, the essential parts of Köhler illumination are shown in FIG. 1 with lines and cross-hatching indicating various light paths. The light source is indicated in this diagram as a coiled filament 10 of an incandescent lamp. The light is gathered by a collecting lens 11 and passes through a field stop iris diaphragm 12 which is located at the focal plane of the substage condenser lens so that the object being examined is imaged in the plane of the diaphragm, and adjustment of the diaphragm aperture permits the illuminated areas to be adjusted to the size of the object. A condenser iris diaphragm 13 is located at the focal plane of the collecting lens 11 and permits the amount and angularity of the light to be adjusted. Finally, a condenser lens 14 quite close to the object directs the light so that all of the light transmitted from each point in the light source will emerge from the condenser lens 14 as a bundle of parallel rays of such a size as to illuminate the entire object 16 from a direction corresponding to the location of the point in the light source which is considered. Such light rays emanating from two different points in the incandescent filament 10 are indicated in FIG. 1 by cross-hatching at opposite angles.

The consequence of the Köhler arrangement, when the elements are properly located and adjusted, is that the object 16 on the stage 15 is assured of absolutely uniform illumination across the entire field of view, with both axial light and angular light from every direction.

Because of the necessary optical length of the substage Köhler illumination system, it is usual to fold the optical axis by use of a mirror, which, however, is not shown in this diagram.

The elements above the microscope stage 15 and object 16 are all conventional, consisting of an objective lens 17 and an eyepiece lens or lenses collectively designated 18 forming a magnified image of the object visible to the observer on the retina 20 of his eye 19. For photographic purposes, the eyepiece 18 is surmounted by a suitable camera body, as is well understood.

The sequence of operations in conventional photography and in photographic microscopy are essentially the same. A subject is selected, the composition is arranged, the camera or the microscope is focused and the exposure is made. In conventional photography, the exposure may be made by electronic flash alone or it may be made by a combination of electronic flash and ambient light. In conventional photography, the important acts of selection and focusing are performed with ambient light. The ambient light is taken for granted.

In photography with the microscope, the situation is not as simple. A special source of light must be provided to permit the necessary selection of the subject and the focusing of the microscope. The electronic flash is transitory and of no value for these purposes.

The ideal illuminator would provide light from a continuous source for observation and focusing up to the moment of photographic exposure and then permit exposure by electronic flash alone. The duration of the flash should be automatically controlled so that the object is exposed correctly. But the requirements go even further. For completely successful and technically faultless results, the light furnished to the illuminating system of the microscope by the continuous source and by the electronic flash must conform strictly to the rigid optical requirements of microscope illuminating systems.

In this invention all of the requirements have been met by a unique combination of an incandescent lamp, an electronic flash, and a fiber optic bundle (generally called simply "Fiber optic") with a conventional substage condenser and preferably such a condenser forming part of a Köhler illumination system. The light from the lamp and from the flash is fed at the proper time into the entrance end of the fiber optic. The light travels through the fiber optic to the exit end of the fiber optic which then appears functionally to be the source of light, the basic source for the illuminating system of the microscope. This exit end of the fiber optic is placed at the entrance pupil of the illuminating system which is the precise location demanded by the optical requirements of the system.

Figure 2:
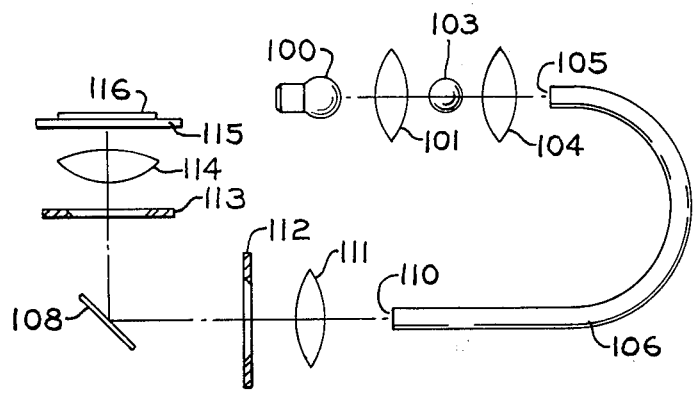
FIG. 2 is a diagrammatic illustration showing how the Köhler illumination system is supplemented in accordance with one embodiment of this invention.

Thus, in a simple form of the invention, shown diagrammatically in FIG. 2, an incandescent lamp 100 is aligned with a first collecting lens 101, an electronic flash tube 103, a second collecting lens 104 and the input end 105 of a fiber optic 106. The spacing of these elements is such that light from the incandescent lamp 100 is brought to a focus at the flash tube 103, and the light from the flash tube 103, whether originally from the incandescent lamp or whether originating in the tube, is brought to a focus at the input end 105 of the fiber optic 106. The second collecting lens 104 can be omitted with almost equivalent results if the size of the flash tube and of the input end 105 of fiber optic 106 are about the same and the flash tube is placed immediately adjacent to the fiber optic.

The exit end 110 of the fiber optic 106 replaces lamp 10 in FIG. 1 as the origin or entrance pupil of light passing through the Köhler illuminating system to the object. Thus the same elements are found as in FIG. 1, namely, a collecting lens 111, a field stop diaphragm 112, a condenser diaphragm 113, a condenser lens 114, and a stage 115 holding the object 116. One additional element may be inserted, namely mirror 108, which folds the optical path and reduces the vertical height of the instrument as is frequently done.

The actual microscope elements are omitted from this Figure, for simplicity, but are shown in detail in FIG. 3.

The illuminating system as shown in FIG. 2 exhibits many of the important advantages of this invention. It provides for transmittal to the standard Köhler illuminating system of two different kinds of light, individually controllable at the will of the operator, one for all preliminary operations of selecting a subject, arranging the composition of the picture and focusing; the other for the actual photographic exposure. It removes both sources of light to a convenient distance from the microscope, leaving a free field for the operations performed by the user of the instrument. It removes all sources of heat to a location where they can have no effect on the object or the instrument, with only cool light entering the microscope.

Other important advantages are provided by combining the foregoing combination with means for automatic control of exposure of the photographic film in the camera. Such a total combination is shown in FIG. 3, illustrating a complete photographic microscope which exemplifies a preferred embodiment of this invention.

The combination shown in FIG. 3 includes all of the elements shown diagrammatically in FIG. 2. This includes an incandescent lamp 100 which may be mounted in a conventional finned or louvered housing for convection cooling, with the light focused by a first collecting lens 101 on the center of flash tube 103, and a second collecting lens 104 focusing the light on the input end 105 of fiber optic 106.

As is well known, the fiber optic contains a multitude of fine glass filaments, preferably having a thin coating of low refractive index to assure total internal reflection along the entire length, and with smooth end faces for entrance and exit of the light. Such fiber optics function as "light pipes", conveying the light from one end to the other regardless of presence of curves in the fiber optic.

The exit end 110 of fiber optic 106 functions as the light source or entrance pupil of the Köhler illumination system. Accordingly, the system includes a third collecting lens 111 and a field stop iris diaphragm 112. The lens 111 forms an image of the entrance pupil, that is, an image of the exit end 110 of the fiber optic, in the plane of the condenser diaphragm 113, after reflection by mirror 108. The substage condenser lens 114 is above the diaphragm 113 and immediately below the surface of the stage 115 supporting the object 116.

The entrance pupil of the illumination system, which is the exit end 110 of the fiber optic, and also the associated collecting lens 111 and diaphragm 112, are mounted on an extension of the microscope stand at the back of the instrument, where they are out of the way. The fiber optic 106 is then curved in any convenient direction to locate the actual lamps 100 and 103 in their housing in a convenient location completely out of the way of the operator yet close enough for compactness of arrangement, on the back of the microscope table, or on a stand, or on a nearby wall.

If a microscope is equipped with a Köhler illumination system having a lamp housed in the base of the instrument, it is easily converted to incorporate this invention by placing the exit of the fiber optic in the exact location where the lamp filament was previously placed.

The illuminated object 116 on the microscope stage 115 is examined through a selected microscope objective lens 120, which may be mounted along with other objective lenses of different magnifying power in a conventional turret 121. The light path through the microscope then passes a conventional array of beam splitting mirrors or prisms (not shown) in the microscope tube so as to form an image of the object 116 in each of the three tubes, namely the vertical camera tube 125 carrying the camera 126, and the inclined pair of binocular viewing tubes 130 and 131, each of which contains a standard eyepiece 132.

In this embodiment of the invention, the duration of the photographic exposure is controlled by an ordinary integrating light meter such as is commonly used with a photographic electronic flash outfit.

For this purpose of exposure control, an additional beam splitter is placed in the optical axis of the camera. In the camera tube 125 at any convenient point along its length is inserted a hollow block 150 with a side tube 152. Within the block 150 is placed a transparent 45° plane mirror indicated by dotted line 151 such as a thin sheet of glass directing the reflected light to the light meter 133. Although the glass reflects only a small fraction of the light, the intensity of the flash and the sensitivity of the sensor in the light meter are so great that satisfactory automatic cutoff of the flash is achieved without significant reduction of the light transmitted to the photographic medium in the camera.

The light meter 133 contains the usual adjustment dial 134 for regulating the total radiant energy of light received before a signal pulse is sent to the electronic flash unit.

The camera tube 125 may also contain a separate focusing magnifier 127 for final checking of the accuracy of focus, as well as a trigger 128 for actuating the camera shutter.

The electronic flash tube 103 is powered by a conventional power pack 135 including a high voltage electric source such as a capacitor charged by high voltage electricity originating from s self-contained battery or other source of energy. The flash tube 103, power pack 135, light meter 133, and camera 126 are all interconnected by suitable electric cords so that they can each perform their intended functions in the usual manner. That is, the shutter of the camera 126 in fully open position signals the power pack 135 to send an electric pulse to the trigger wire of the electronic flash tube 103, making the gas in the tube conductive so that the high voltage charge in the capacitor of the power pack 135 starts to flow through the gas to generate the desired intensely brilliant flash of light. The light meter 133, after receipt of the total quantity of light energy for which it is adjusted, signals the power pack 135 to make a control element such as a thyristor nonconductive and terminate flow of electric energy to the flash tube 103 thus quenching the light after a very brief time in the approximate range of a thousandth to a ten-thousandth of a second, or less.

When properly calibrated for the speed of the particular kind of photographic medium with which the camera is loaded, the combination as described above can be relied on to produce exactly the proper illumination for correct exposure of every one of a series of photomicrographic views, even though differing greatly one from another in light transmission, and to do this in the very simplest possible manner.

Figure 4:
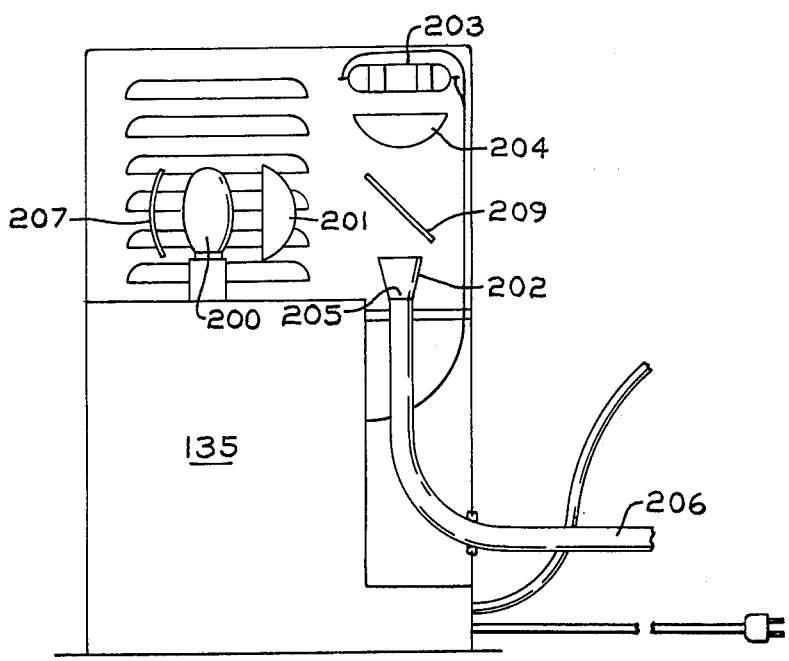
FIG. 4 is a diagrammatic representation of an alternate way in which essentially the entire light supply equipment can be combined into a single conveniently handled unit.

FIG. 4 shows diagrammatically an alternative arrangement of the elements of this invention, in which the two sources of light, the incandescent lamp and the flash tube, are directed to the input end of the fiber optic in a different manner.

In the specific arrangement of FIG. 4 the flash tube 203 and collecting lens 204 are aligned with the input end 205 of fiber optic 206 so as to assure efficient use of the brief flash of light for the photographic exposure. In this, as well as in the other embodiments of the invention, an internally reflective narrow funnel 202 may be placed over the input end 205 of the fiber optic to gather somewhat more light than that which would be received by the end 205 of the fiber optic alone.

The continuously operating incandescent lamp 200 is placed at one side with its light reflected by a 45° mirror 209 into the input end 205 of the fiber optic. The mirror 209, if made of uncoated glass of reasonably high refractive index, will transmit most of the light directed to it from the flash tube 203 and still reflect enough of the light from the incandescent lamp 200 for satisfactory ocular viewing, focusing, etc. Nevertheless, if most efficient light from both sources is desired, an opaque metal-coated mirror may be used and be flipped out of the way, simultaneously with opening of the camera shutter, by an suitable simple mechanism such as an electromagnet. Here again it is most convenient to combine in a single enclosure the power pack 135 along with both lamps and the input end 205 of the fiber optic as shown in FIG. 3.

In FIG. 4, a collecting lens 201 focuses the light from incandescent lamp 200, by way of mirror 209, on the input end 205 of the fiber optic. If desired, the efficiency of utilization of the light from both sources may be enhanced by placing a spherical mirror 207 with its center near the source of light in each lamp, and particularly behind the incandescent lamp 200 as shown in FIG. 4, so as to offset some of the loss of light because of only partial reflection by the transparent mirror 209.

Figure 5:
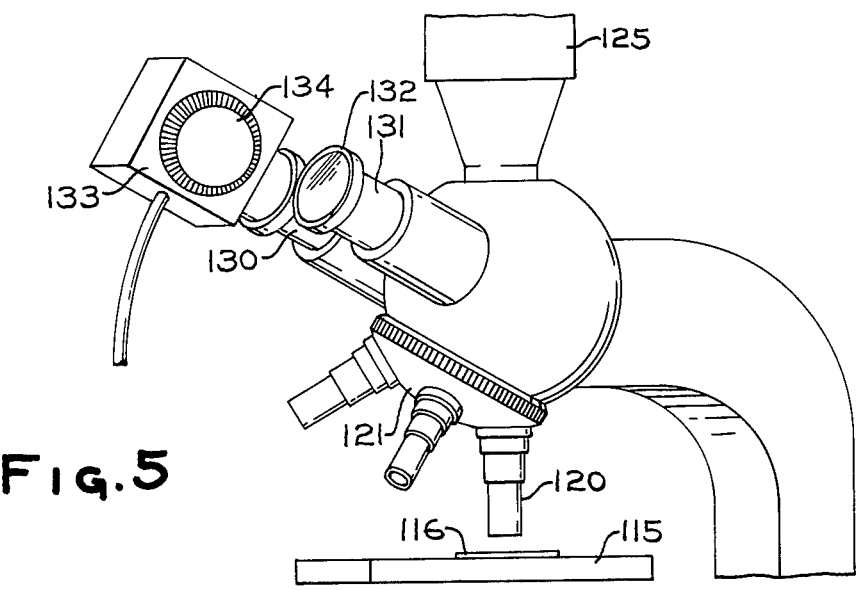
FIG. 5 illustrates an alternative arrangement of the light measuring control unit.

A further modification of the invention is shown in FIG. 5, which does not require any modification of the actual microscope structure. In this case, the added beam splitter and side tube are not used. Instead, the eyepiece 132 in the left binocular viewing tube 131 is replaced by the light meter 133. This leaves eyepiece 132 in the right tube 130 for use of the left eye for viewing the object during its positioning for a photograph, and focusing.

Figure 6:
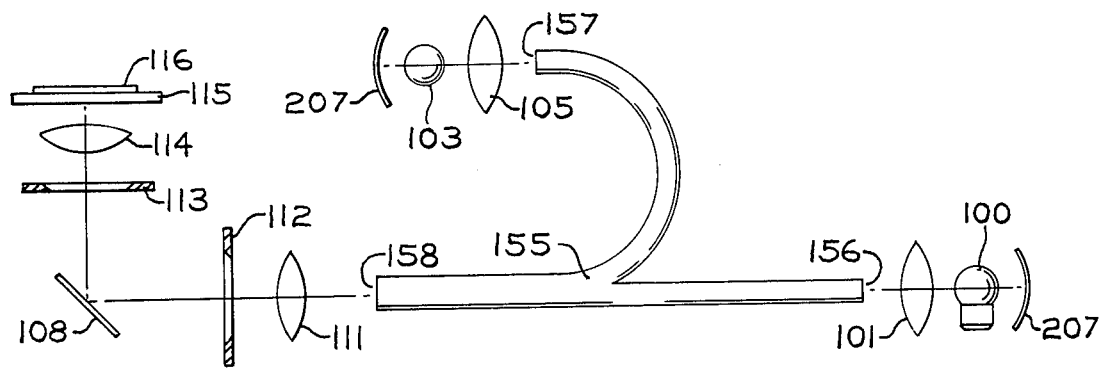
FIG. 6 is a diagrammatic illustration of an illuminating system embodying a bifurcated fiber optic unit instead of a simple one.

A still further modification shown diagrammatically in FIG. 6 involves use of a bifurcated fiber optic. Such devices consist of two bundles of glass filaments at one end, with the two bundles brought together at a point between their ends and being mingled randomly at the other end, and having the general appearance of a letter Y.

In this modification of the invention, such a bifurcated fiber optic 155 has the two single ends designated 156 and 157 and the joined end 158. The joined end 158 in this instance is the exit end and is placed at the entrance pupil of the Köhler illumination system, in optical alignment with collecting lens 111, field stop diaphragm 112, condenser diaphragm 113 and the substage condenser lens 114, as previously described. One of the single ends 156 of the branched part of the fiber optic is optically coupled by collecting lens 101 with incandescent lamp 100 which is optionally backed by a spherical mirror 207. The other single end 157 is optically coupled with flash tube 105 by collecting lens 104 and optionally by another spherical mirror 207. This arrangement is in many ways the simplest of all, since each of the two light sources can be operated at high efficiency and therefore with low waste heat generation, without either interfering in any way with the other, and without the need for any moving parts which might be subject to mechanical failure.

Illumination of opaque objects or those requiring examination from the same side as the illumination can also be accomplished according to this invention. Illumination from above, which is often called "vertical" illumination, can be carried out in various ways depending on the magnification desired and the design of the equipment which is available. All of the ways benefit from use of fiber optics in conveying light from the two essential sources to the object on the stage of the microscope.

In the simplest form, the continuous light and the flash light are separately directed into the entrance of a fiber optic in one of the ways described above. The light which issues from the other end of the fiber optic is directed on the upper surface of the object, preferably through a condenser lens in order to contract the diverging cone of light issuing from the fiber optic to a size more nearly that of the microscope field of view, for efficiency and for avoidance of any need for a particularly bright and therefore excessively hot continuous light.

In such vertical or surface illumination, precise control of exposure of the photographic medium is easily achieved by the same kind of measurement of the light passing through the optical system of the microscope, as already described.

Figure 7:
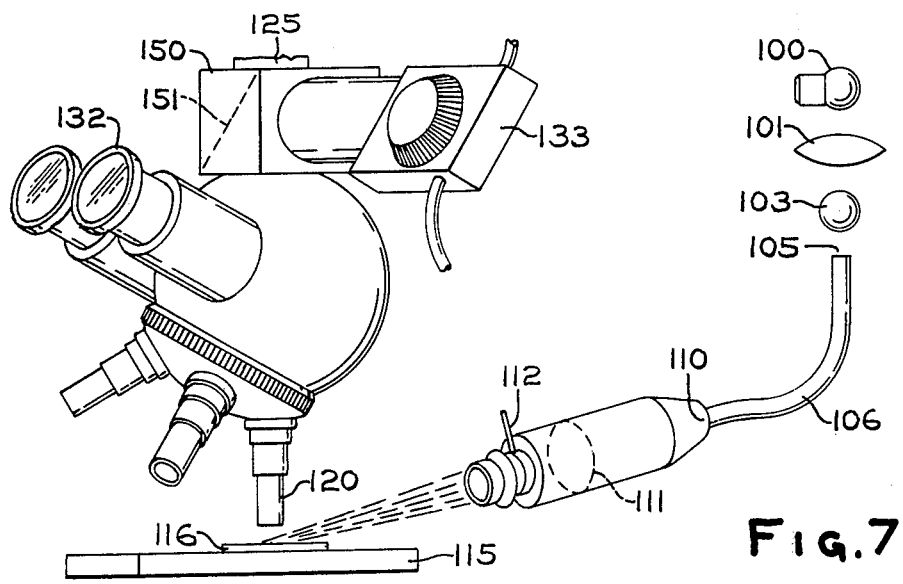
FIG. 7 is a diagrammatic illustration of an illuminating system in which the light is directed on the upper surface of the object instead of through the object from below.

FIG. 7 illustrates such an arrangement, in which an incandescent lamp 100 is aligned with a collecting lens 101 focusing the light on the glass tube of a flash tube 103 which is immediately adjacent to the entrance end 105 of fiber optic 106. The exit end 158 of the fiber optic is aligned with another collecting lens 111 and an iris diaphragm 112. The light emerging from the fiber optic 106 is concentrated by the lens 111 into a narrow beam which is directed at the upper surface of object 116 on microscope stage 115. The light makes visible the object 116 through objective lens 120 and the eyepieces 132 as well as through the camera tube 125.

Camera tube 125, as in FIG. 3, preferably includes a hollow block 150 containing a 45° mirror 151 directing a small fraction of the light in camera tube 125 toward light meter 133 for cut off of the flash illumination at the exact moment when proper exposure of the photograph is achieved. Of course, this requires separate calibration of the light meter for this surface illumination arrangement.

The most uniform and desirable vertical illumination is obtained by use of the Köhler illumination system, just as for substage illumination, except that the elements of the system are placed in a different location.

Some Köhler system surface illuminators reflect the light from a source on one side of the microscope tube into and through the microscope objective lens by means of a transparent mirror, with the objective lens functioning as the condenser for the illumination.

Others mask the center of a beam of light and reflect a hollow cylinder of light around the objective lens with a final inward reflection from the inner surface of a segment of a cone, with the conical reflector performing the function of a condenser lens.

In any such arrangement, the illumination can be circumferentially uniform or partially masked for illumination entirely or principally from one side of the optical axis.

The conversion of any Köhler illuminator for opaque objects so that this invention can be used requires only the removal of the existing light source, and its replacement by the exit end of a fiber optic at the entrance pupil of the illuminator, with continuous light and flash light supplied to the other end of the fiber optic in any or the ways described above. Preferably, however, a light meter is introduced into the microscope optical system to provide exact control of the flash exposure.

As is apparent from the foregoing examples, the complete functioning of this invention involves essentially three parts. First, sending light from a continuously illuminated lamp and from an electronic flash lamp in an effective manner into the entrance end of a fiber optic. Second, placing the exit end of the fiber optic in the entrance pupil of a conventional illuminating system including a condenser lens and preferably a substage condenser lens of a Köhler system so that the emerging light will be used effectively and correctly. Third, preferably including also a sensor to monitor the electronic flash so that the object will receive the correct exposure.

In a conventional illuminator for the microscope, the continuous illumination is ordinarily an incandescent lamp at the entrance pupil of the illuminating system. The lamp is enclosed in a housing, or as in many modern examples, the lamp is placed within the base of the microscope. In either case the space surrounding the lamp is greatly restricted and is also subjected to considerable heat. Effective direction of the light rays from either of the two sources, the incandescent lamp or the electronic flash, individually along the optical axis at this small precise location is difficult, but to locate both light rays simultaneously at this point and in the proper direction is a practical impossibility.

By the use of the fiber optic the problem is solved without difficulty. The incandescent lamp with a collecting lens or mirror and a housing, and the electronic flash with or without a collecting lens or mirror but with a housing, are located near the entrance end of the fiber optic. In this location there is no special restriction on space. In addition, because of the unique properties of fiber optics, precise direction of the light is not required. By one of several possible arrangements the concentrated light rays from the incandescent lamp and from the electronic flash are fed alternately or simultaneously into the entrance end of the fiber optic. Thus captured, the light rays function as a new source at the exit end which is also the entrance pupil of the illuminating system. The apparent source of light at the entrance pupil of the illuminating system now becomes exactly the same from either the incandescent lamp or the flash.

This combination provides the ideal illumination which was defined earlier in this description, the capability of using a continuous source of light for the operations of selecting, composing and focusing the object and at the climax of these operations to make the exposure with the electronic flash, with the assurance, in both phases of the operation, of truly uniform illumination which is optically exactly equivalent in every respect except light intensity. It is possible also to diminish the incandescent light to a substantially nonactinic degree during the electronic flash exposure but strong enough to observe the object, if that should be desired.

This invention can take many different forms. In each of them, the combination of a flash lamp with a fiber optic and a Köhler illumination system achieves at a modest cost the dual purposes of pronounced improvement in simplicity and convenience of manipulation by the operator and of improvement in quality and reliability of results. The improvements are particularly pronounced when automatic flash timing by a light sensor is also included.

It is even possible to utilize the fiber optic in the branched form, both for illumination of an object and for control of the duration of the flash, particularly for surface illumination. For this purpose both sources of light are directed into one branch of the fiber optic, from which the light is focused on the object, with precautions to eliminate or neutralize reflecting surfaces between the fiber optic and the object, and the light meter is coupled to the other branch of the fiber optic.

I claim:
1. A photomicrographic instrument comprising:
   a. a compound microscope equipped with a camera,
   b. a stage for said microscope for positioning an object to be photographed,
   c. A Köhler microscope illuminating system for illuminating said object, including at least a collecting lens, a field stop diaphragm, a condenser diaphragm, and a condenser lens,
   d. a fiber optic with one end at the entrance pupil of the illuminating system, facing the illuminating system,
   e. illumination means comprising at least one light source, which illumination means are capable collectively of providing light of low intensity and of high intensity at different sequential times,
   f. said illumination means being arranged to direct the light to the fiber optic end remote from the entrance pupil of the illuminating system, and
   g. control means for limiting the total radiant energy of the high intensity light in the camera in response to an integrating light sensor in the microscope optical system.

2. A photomicrographic instrument comprising:
a. a compound microscope equipped with a camera,
b. a stage for said microscope for positioning an object to be photographed,
c. a substage Köhler microscope illuminating system for illuminating said object, including at least a collecting lens, a field stop diaphragm, a condenser diaphragm, and a condenser lens,
d. a fiber optic with one end at the entrance pupil of the illuminating system, facing the illuminating system,
e. illumination means comprising two light sources, one of which is capable of providing continuous light of low intensity and the other of which is capable of providing a flash of high intensity light,
f. said illumination means being arranged to direct the light to the fiber optic end remote from the entrance pupil of the illuminating system, and
g. control means for limiting the total radiant energy of the high intensity light in the camera in response to an integrating light sensor in the microscope optical system.

3. An instrument as in claim 2 in which the high intensity source of light is coupled to the camera shutter for illumination when the shutter is opened.

4. An instrument as in claim 3, in which the illumination means comprises a low intensity light source and a separate high intensity light source, each of which may be selectively directed to the fiber optic.

5. An instrument as in claim 4, in which the microscope optical system includes a beam splitter for directing a predetermined fraction of the light in the optical system to the light sensor.

6. A photomicrographic instrument comprising:
a. a compound microscope equipped with a camera,
b. a stage for said microscope for positioning an object to be photographed,
c. a Köhler microscope illuminating system for illuminating said object, including at least a collecting lens, a field stop diaphragm, a condenser diaphragm, and a condenser lens,
d. a branched fiber optic with the joined end at the entrance pupil of the illuminating system, and
e. a high intensity flash source of light directed to one of the branches of the fiber optic.

7. An instrument as in claim 6 in which a continuous light is directed to the other branch of the fiber optic.

8. An instrument as in claim 7 in which the illumination is under the stage of the microscope for passage of the light to the microscope through the object.

9. An instrument as in claim 8 in which the flash source of light is coupled to the camera shutter for illumination when the shutter is opened.

10. An istrument as in claim 9 which the instrument includes means for transmitting a predetermined fraction of the light in the microscope optical system to an integrating light sensor for terminating the flow of energy to the flash source of light.

* * * * *